(12) United States Patent
Hogge et al.

(10) Patent No.: US 6,932,720 B2
(45) Date of Patent: Aug. 23, 2005

(54) GOLF BALL WITH VAPOR BARRIER LAYER AND METHOD OF MAKING SAME

(75) Inventors: Matthew F Hogge, Mattapoisett, MA (US); Mitchell E Lutz, Fairhaven, MA (US); Michael J Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/754,781

(22) Filed: Jan. 9, 2004

(65) Prior Publication Data

US 2004/0142769 A1 Jul. 22, 2004

Related U.S. Application Data

(63) Continuation of application No. 10/103,414, filed on Mar. 21, 2002, which is a continuation-in-part of application No. 09/973,342, filed on Oct. 9, 2001, now Pat. No. 6,632,147.

(51) Int. Cl.⁷ .......................... A63B 37/04; A63B 37/06; A63B 37/00
(52) U.S. Cl. ...................................... 473/374; 473/351
(58) Field of Search ................................. 473/351–378

(56) References Cited

U.S. PATENT DOCUMENTS

| | | | |
|---|---|---|---|
| 2,356,128 A | 8/1944 | Thomas et al. ................ 260/79 |
| 3,099,644 A | 7/1963 | Parker et al. ............... 260/85.3 |
| 3,241,834 A | 3/1966 | Stingley | |
| 3,313,545 A | 4/1967 | Bartsch | |
| 3,502,338 A | * 3/1970 | Cox ............................ 473/372 |
| 3,642,728 A | 2/1972 | Canter ......................... 260/79.3 |
| 3,989,568 A | 11/1976 | Isaac ............................ 156/182 |
| 4,123,061 A | 10/1978 | Dusbiber | |
| 4,141,559 A | * 2/1979 | Melvin et al. ................ 473/372 |
| 4,165,425 A | 8/1979 | Bertozzi ....................... 528/374 |
| 4,209,485 A | 6/1980 | Greespan ..................... 264/242 |
| 4,229,337 A | 10/1980 | Brenner ....................... 260/32.6 |
| 4,234,705 A | 11/1980 | Matoba ........................ 525/329 |
| 4,239,799 A | 12/1980 | Weinberg et al. ............ 428/335 |
| 4,250,273 A | * 2/1981 | Bohm et al. ................... 525/99 |
| 4,263,078 A | 4/1981 | Millen et al. ............. 156/244.1 |
| 4,356,676 A | 11/1982 | Hauptman .................... 52/403 |
| 4,863,167 A | 9/1989 | Matsuki et al. | |
| 4,995,613 A | 2/1991 | Walker | |
| 5,184,828 A | 2/1993 | Kim et al. | |
| 5,468,527 A | 11/1995 | Peiffer et al. .............. 428/35.7 |
| 5,506,014 A | 4/1996 | Minnick ..................... 428/35.7 |
| 5,605,512 A | 2/1997 | Yamada et al. ............. 473/354 |
| 5,672,393 A | 9/1997 | Bachmann et al. .......... 427/493 |
| 5,677,362 A | 10/1997 | Bachmann et al. ............ 522/28 |
| 5,685,785 A | 11/1997 | Kakiuchi et al. ............ 473/354 |
| 5,755,628 A | 5/1998 | Kakiuchi et al. ............ 473/354 |
| 5,779,562 A | 7/1998 | Melvin et al. ............... 473/373 |
| 5,820,488 A | 10/1998 | Sullivan et al. ............. 473/374 |
| 5,873,796 A | 2/1999 | Cavallaro et al. ........... 473/365 |
| 5,875,891 A | 3/1999 | Snell ......................... 206/315.9 |
| 5,882,567 A | 3/1999 | Cavallaro et al. ........... 264/255 |
| 5,885,172 A | 3/1999 | Hebert et al. ................ 473/354 |
| 5,908,358 A | 6/1999 | Wu .............................. 473/378 |
| 5,919,100 A | 7/1999 | Boehm et al. ............... 473/354 |
| 5,965,669 A | 10/1999 | Cavallaro et al. ........... 525/221 |
| 5,981,654 A | * 11/1999 | Rajagopalan ................. 525/66 |
| 5,984,806 A | * 11/1999 | Sullivan et al. ............. 473/373 |

(Continued)

FOREIGN PATENT DOCUMENTS

| | | |
|---|---|---|
| GB | 2280379 A | 2/1995 |
| WO | WO 00/23519 | 4/2000 |
| WO | WO 01/29129 | 4/2001 |

*Primary Examiner*—Gregory Vidovich
*Assistant Examiner*—Alvin A. Hunter, Jr.

(57) ABSTRACT

A golf ball with at least one moisture vapor barrier layer is disclosed. The moisture vapor barrier layer comprises an elastomer, and has a moisture vapor transmission rate of less than about 0.6 grams·mm/m²·day.

13 Claims, 2 Drawing Sheets

U.S. PATENT DOCUMENTS

| | | | |
|---|---|---|---|
| 6,010,412 A | 1/2000 | Moriyama | 473/373 |
| 6,030,296 A | 2/2000 | Morgan et al. | 473/361 |
| 6,045,460 A | 4/2000 | Hayashi et al. | 473/376 |
| 6,062,283 A | 5/2000 | Watanabe et al. | 152/510 |
| 6,066,054 A | 5/2000 | Masutani | 473/374 |
| 6,106,415 A | 8/2000 | Masutani et al. | 473/374 |
| 6,113,505 A | 9/2000 | Boehm | 473/357 |
| 6,117,024 A | 9/2000 | Dewanjee | 473/351 |
| 6,123,628 A | 9/2000 | Ichikawa et al. | 473/371 |
| 6,126,558 A | 10/2000 | Higuchi et al. | 473/374 |
| 6,132,324 A | 10/2000 | Hebert et al. | 473/378 |
| 6,135,898 A | 10/2000 | Higuchi et al. | 473/374 |
| 6,142,888 A | 11/2000 | Higuchi et al. | 473/374 |
| 6,174,388 B1 | 1/2001 | Sikka et al. | 148/512 |
| 6,180,715 B1 | 1/2001 | Schmidt | 524/611 |
| 6,200,511 B1 | 3/2001 | Peiffer et al. | 264/176.1 |
| 6,232,389 B1 | 5/2001 | Feeney et al. | 524/450 |
| 6,334,919 B1 | 1/2002 | Takeyama et al. | 156/123 |
| 6,342,567 B2 | 1/2002 | Minagawa et al. | 525/192 |
| 6,346,571 B1 | 2/2002 | Dharmarajan et al. | 525/72 |
| 6,354,965 B1 | 3/2002 | Harris et al. | 473/354 |
| 6,398,668 B1 | 6/2002 | Wai | 473/354 |

* cited by examiner

GOLF BALL WITH VAPOR BARRIER LAYER AND METHOD OF MAKING SAME

STATEMENT OF RELATED PATENT APPLICATION

This non-provisional utility patent application is a continuation of U.S. patent application Ser. No. 10/103,414, filed on Mar. 21, 2002, which is a continuation-in-part of U.S. patent application Ser. No. 09/973,342, filed on Oct. 9, 2001, now U.S. Pat. No. 6,632,147. The parent application and patent are hereby incorporated by reference in their entirety.

FIELD OF THE INVENTION

The present invention relates to a novel structure for a golf ball, and more particularly to a golf ball with a moisture vapor barrier layer.

BACKGROUND OF THE INVENTION

Solid core golf balls are well known in the art. Typically, the core is made from polybutadiene rubber material, which provides the primary source of resiliency for the golf ball. U.S. Pat. Nos. 3,241,834 and 3,313,545 disclose the early work in polybutadiene chemistry. It is also known in the art that increasing the cross-link density of polybutadiene can increase the resiliency of the core. The core is typically protected by a cover from repeated impacts from golf clubs. The golf ball may comprise additional layers, which can be an outer core or an inner cover layer. One or more of these additional layers may be a wound layer of stretched elastic windings to increase the ball's resiliency.

A known drawback of polybutadiene cores cross-linked with peroxide and/or zinc diacrylate is that this material is adversely affected by moisture. Water moisture vapor reduces the resiliency of the cores and degrades its properties. A polybutadiene core will absorb water and loose its resilience. Thus, these cores must be covered quickly to maintain optimum ball properties. The cover is typically made from ionomer resins, balata, and urethane, among other materials. The ionomer covers, particularly the harder ionomers, offer some protection against the penetration of water vapor. However, it is more difficult to control or impart spin to balls with hard covers. Conventional urethane covers, on the other hand, while providing better ball control, offer less resistance to water vapor than ionomer covers.

Prolonged exposure to high humidity and elevated temperature may be sufficient to allow water vapor to invade the cores of some commercially available golf balls. For example at 110° F. and 90% humidity for a sixty day period, significant amounts of moisture enter the cores and reduce the initial velocity of the balls by 1.8 ft/s to 4.0 ft/s or greater. The change in compression may vary from 5 PGA to about 10 PGA or greater. The absorbed water vapor also reduces the coefficient of restitution (CoR) of the ball.

Several prior patents have addressed the water vapor absorption problem. U.S. Pat. No. 5,820,488 discloses a golf ball with a solid inner core, an outer core and a water vapor barrier layer disposed therebetween. The water vapor barrier layer preferably has a water vapor transmission rate lower than that of the cover layer. The water vapor barrier layer can be a polyvinylidene chloride (PVDC) layer. It can also be formed by an in situ reaction between a barrier-forming material and the outer surface of the core. Alternatively, the water vapor barrier layer can be a vermiculite layer. U.S. Pat. Nos. 5,885,172 and 6,132,324 disclose, among other things, a golf ball with a polybutadiene or wound core with an ionomer resin inner cover and a relatively soft outer cover. The hard ionomer inner cover offers some resistance to water vapor penetration and the soft outer cover provides the desirable ball control. Additionally, U.S. Pat. No. 5,875,891 discloses an impermeable packaging for golf balls. The impermeable packaging acts as a moisture barrier to limit moisture absorption by golf balls during storage, but not during use.

The moisture vapor barrier layer disclosed in the prior patents can be rigid and makes the ball stiffer. Furthermore, producing a rigid layer may cause significant production obstacles. On the other hand, less rigid polymers, such as butyl rubber and other rubbers, are known to have low permeability to air, gases and moisture. Butyl rubber is widely used as sealant for rooftops, as inner liner in tubeless tires, and as lining for chemical tanks, among other uses. In the golf ball art, butyl rubber's usage has been limited to practice balls or driving range balls due to its slow initial velocity and low CoR, as discussed in U.S. Pat. Nos. 5,209,485 and 4,995,613. Butyl rubber is also used as the outermost cover layer or a part of the cover due to its durability, as disclosed in U.S. Pat. Nos. 5,873,796 and 5,882,567, among others. However, the moisture vapor barrier advantage of butyl rubber has not heretofore been utilized in the golf ball art to make a better performing golf ball.

Also, high-temperature curing of certain polymeric materials to form the water vapor barrier layer or other outer layers on the golf ball is difficult to accomplish, since such curing or crosslinking heats the entire golf ball subassembly. This heating method may degrade the untargeted components or layers within the subassembly. Additionally, this curing method limits suitable outer layer materials to materials having a cured temperature that is lower than the softening temperature or lower melting temperature of the inner layers or core.

Hence, there remains a need for a golf ball with an improved water vapor barrier layer and improved methods for applying a water vapor barrier layer on to the core of the golf ball.

SUMMARY OF THE INVENTION

The present invention is directed to a golf ball comprising a layer of moisture vapor barrier with a moisture vapor transmission rate preferably lower than that of the cover. Preferably, the moisture vapor barrier layer comprises butyl rubber. The butyl rubber may also be a halogenated butyl rubber such as bromobutyl rubber or chlorobutyl rubber. The butyl rubber may also be a sulfonated butyl rubber. The butyl rubber may be blended with other polymers, such as double bond-vulcanizable rubber, ethylene propylene diene monomer rubber and vinylidene chloride.

The present invention is also directed to a golf ball comprising a moisture vapor barrier layer, which comprises copolymer of isobutylene and p-methylstyrene or polyisobutylene.

In accordance to another aspect of the invention, the moisture vapor barrier layer is placed on to a core subassembly and cured by infrared radiation (IR). IR-curable moisture vapor barrier materials include, but not limited to, butyl rubber, polysulfide rubber and single-pack castable polymers, among others.

In accordance to another aspect of the invention, an outer layer of the golf ball may comprise a polymer that has a cured temperature greater than the softening temperature or melting temperature of the encased subassembly. Such outer layer may be cured by IR. The outer layer may be a cover, an intermediate layer or a moisture vapor barrier layer.

The present invention is also directed to a golf ball comprising a butyl rubber moisture vapor barrier and a relatively soft cover. Preferably, the soft cover has a Shore D of less than 65 or between about 30 and about 60, and more preferably between about 35 and about 50, and most preferably about 40 and about 45. The cover preferably has a thickness of between about 0.010 inch to about 0.050 inch, and more preferably about 0.030 inch. The cover preferably comprises a thermoset polymer.

The present invention is further directed to a golf ball comprising a moisture vapor barrier layer with a moisture vapor transmission rate of less than about 0.6 grams·mm/m²·day, formed from a composition comprising an elastomer, preferably in combination with a double-bond vulcanizable rubber. The elastomer may comprise at least a conjugated multi-olefin or an iso-olefin. The present invention is also directed to a golf ball having a moisture vapor barrier layer that incorporates an elastomeric homopolymer or copolymer, preferably amorphous and non-polar, that comprises about 0.2% to about 30% by weight of a conjugated multi-olefin having about 4 to about 14 carbon atoms, an iso-olefin having greater than 4 to about 7 carbon atoms, or a combination of the two. The elastomeric copolymer may contain about 70% to about 99.8% by weight of the iso-olefin.

The elastomer may be halogenated, sulfonated, or both. The elastomer may also comprise branched styrenic blocks. When halogenated, the elastomer may comprises at least one of the following: less than about 3% reactive halogen; less than about 1 halogen atom per double bond; a benzylic bromine functionality; or a branched styrenic block. Preferably, the elastomer may have a molecular weight of about 20,000 to about 500,000. In one embodiment, the elastomeric homopolymer or copolymer is a highly paraffinic hydrocarbon polymer composed on long straight chain molecules containing only chain-end olefinic bonds. In another embodiment, the elastomer is a copolymer or brominated copolymer of p-methylstyrene and isobutylene.

The composition that forms the moisture vapor barrier layer preferably has a moisture vapor transmission rate of about 0.001 grams·mm/m²·day to about 0.1 grams·mm/m²·day. The composition may form a tortuous path against moisture vapor encroachment, for example, by incorporating a filler, preferably selected from a group consisting of leafing aluminum, mica flakes, micaceous iron oxide flakes, aluminum flakes, ceramic flakes, graphite flakes, and mixtures thereof. The composition may further blend in a polymer such as vinylidene chloride polymers and ionomers. Preferably, the composition is a dynamically vulcanizable thermoplastic elastomer blend adhesive to diene rubbers. The composition may be applied in the form of a liquid, latex, viscous liquid, semi-solid, solid, or in solvents, and cured by infra red radiation or a combination of infra red and ultra violet radiations.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
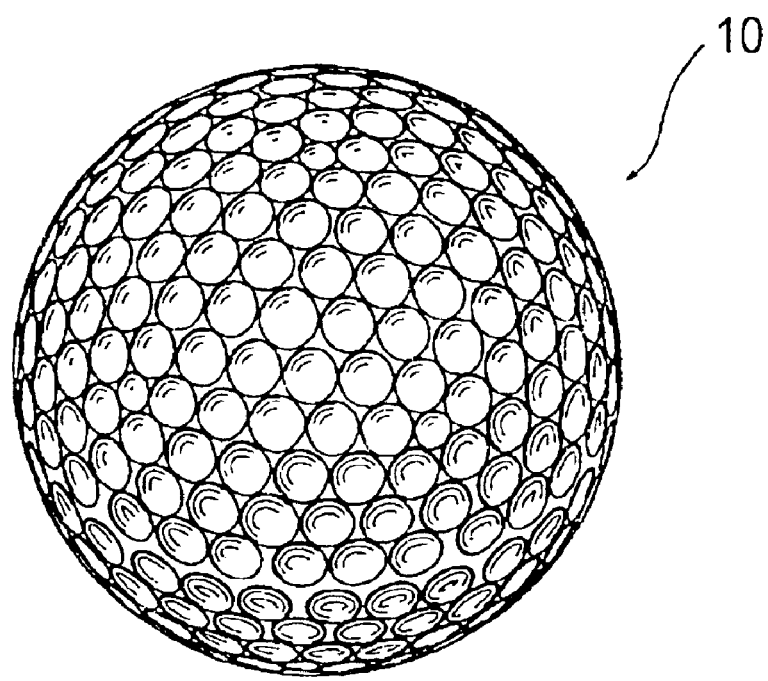
FIG. 1 is a front view of a dimpled golf ball in accordance to the present invention.
Figure 2:
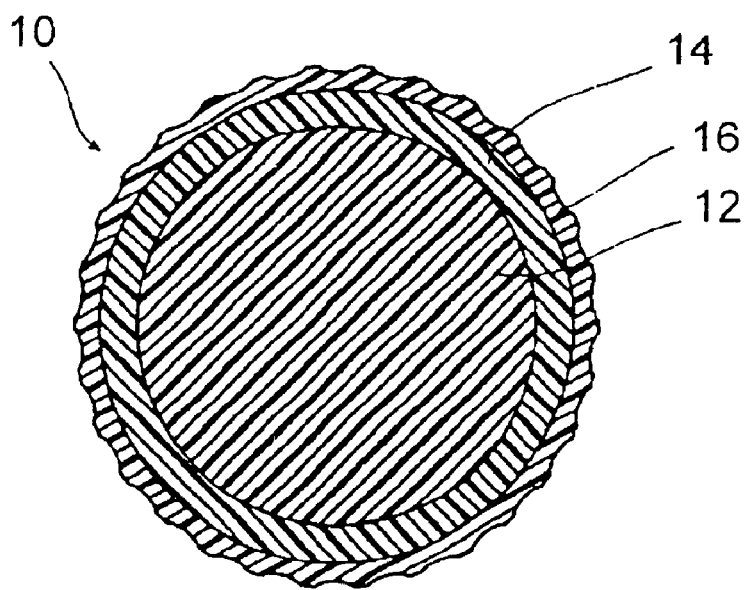
FIG. 2 is a cross-sectional view of the golf ball in FIG. 1 showing a solid core surrounded by a thin moisture vapor barrier layer and a cover.

As shown generally in FIGS. 1 and 2, where like numbers designate like parts, reference number 10 broadly designates a golf ball in accordance with the present invention. Golf ball 10 preferably has a solid core 12, an intermediate layer 14 and a cover 16. Solid core 12 may comprise a single spherical element, or it may comprise a spherical element with one or more intermediate layers surrounding the spherical element. Solid core 12 can be made from any suitable core materials including thermoset plastics, such as natural rubber, polybutadiene (PBD), polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E. I. Du Pont de Nemours and Company, various manufacturers, and Shell Chemical Company, respectively. The core materials can also be formed from a castable material. Suitable castable materials include those comprising a urethane, polyurea, epoxy, silicone, IPN's, etc.

Additionally, suitable core materials may also include a reaction injection molded polyurethane or polyurea, including those versions referred to as nucleated, where a gas, typically nitrogen, is incorporated via intensive agitation or mixing into at least one component of the polyurethane, typically, the pre-polymer, prior to component injection into a closed mold where essentially full reaction takes place resulting in a cured polymer having reduced specific gravity. These materials are referred to as reaction injection molded (RIM) materials. Alternatively, the core may have a liquid center.

Cover 16 is preferably tough, cut-resistant, and selected from conventional materials used as golf ball covers based on the desired performance characteristics. The cover may comprise one or more layers. Suitable cover materials include ionomer resins, such as Surlyn® available from DuPont, blends of ionomer resins, thermoplastic or thermoset urethane, acrylic acid, methacrylic acid, thermoplastic rubber polymers consisting of block copolymers in which the elastomeric midblock of the molecule is an unsaturated rubber or a saturated olefin rubber, e.g., Kraton® rubbers available from Shell Chemical Co., polyethylene, and synthetic or natural vulcanized rubber such as balata.

Additionally, other suitable core and cover materials are disclosed in U.S. Pat. No. 5,919,100 and international publications WO 00/23519 and WO 01/29129. These disclosures are incorporated by reference in their entirety. Preferably, core 12 is made from a polybutadiene rubber material and cover 16 is made from a composition comprising a thermoset or thermoplastic urethane or a composition comprising an ionomer resin.

To prevent or minimize the penetration of moisture, typically water vapor, into core 12 of golf ball 10, intermediate layer 14 comprises a moisture vapor barrier layer preferably disposed around core 12. Preferably, moisture vapor barrier layer 14 has a moisture vapor transmission rate that is lower than that of the cover, and more preferably less than the moisture vapor transmission rate of an ionomer resin such as Surlyn® which is in the range of about 0.45 to about 0.95 grams·mm/m$^2$·day. Typically, the moisture vapor transmission rate of ionomer resin is less than 0.6 grams·mm/m$^2$·day as reported in "Permeability and other Film Properties of Plastics and Elastomer" published by the Plastic Design Library (1995). The moisture vapor transmission rate is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-94 entitled "Standard Test Method for Water Vapor Transmission Rate of Flexible Barrier Materials Using an Infrared Detection Technique," among others.

A preferred polymer for the moisture vapor barrier layer is butyl rubber. Butyl rubber (IIR) is an elastomeric copolymer of isobutylene and isoprene. Detailed discussions of butyl rubber are provided in U.S. Pat. Nos. 3,642,728, 2,356,128 and 3,099,644. The disclosures of these references are incorporated herein by reference in their entireties. Butyl rubber is an amorphous, non-polar polymer with good oxidative and thermal stability, good permanent flexibility and high moisture and gas resistance. Generally, butyl rubber includes copolymers of about 70% to 99.5% by weight of an isoolefin, which has about 4 to 7 carbon atoms, e.g., isobutylene, and about 0.5% to 30% by weight of a conjugated multiolefin, which has about 4 to 14 carbon atoms, e.g., isoprene. The resulting copolymer contains about 85% to about 99.8% by weight of combined isoolefin and 0.2% to 15% of combined multiolefin. Commercially available butyl rubbers, such as those manufactured by ExxonMobil Chemical Company, typically have about 1 to 2.5 mole percent of isoprene. Butyl rubbers generally have molecular weight of about 20,000 to about 500,000. Suitable butyl rubber is also available from United Coatings under the tradename Elastron™ 858. Elastrom 858 is a butyl rubber coating applied as a solution in a volatile hydrocarbon solvent, which is typically sprayed or dipped on to an object or a surface, and contains lead peroxide as a crosslinking agent.

Butyl rubbers are also available in halogenated form. Halogenated butyl rubbers may be prepared by halogenating butyl rubber in a solution containing inert C3—C5 hydrocarbon solvent, such as pentane, hexane or heptane, and contacting this solution with a halogen gas for a predetermined amount of time, whereby halogenated butyl rubber and a hydrogen halide are formed. The halogenated butyl rubber copolymer may contain up to one halogen atom per double bond. Halogenated butyl rubbers or halobutyl rubbers include bromobutyl rubber, which may contain up to 3% reactive bromine, and chlorobutyl rubber, which may contain up to 3% reactive chlorine. Halogenated butyl rubbers are also available from ExxonMobil Chemical. Butyl rubbers and halogenated rubbers advantageously have low permeability to air, gases and moisture. For example, as reported by the manufacturer the permeability of nitrogen in butyl rubber is more than one order of magnitude less than that in neoprene, styrene butadiene rubber, natural rubber and nitrile butadiene rubber.

Butyl rubber is also available in sulfonated form, such as those disclosed in the '728 patent and in U.S. Pat. No. 4,229,337. Generally, butyl rubber having a viscosity average molecular weight in the range of about 5,000 to 85,000 and a mole percent unsaturation of about 3% to about 4% may be sulfonated with a sulfonating agent comprising a sulfur trioxide ($SO_3$) donor in combination with a Lewis base containing oxygen, nitrogen or phosphorus. The Lewis base serves as a complexing agent for the $SO_3$ donor. $SO_3$ donor includes compound containing available $SO_3$, such as chlorosulfonic acid, fluorosulfonic acid, sulfuric acid and oleum.

Typically, the moisture vapor transmission rate of butyl rubber is in the range of about 0.001 to about 0.100 grams·mm/m$^2$·day.

Other suitable moisture vapor barrier polymers include the elastomers that combine the low permeability of butyl rubbers with the environmental and aging resistance of ethylene propylene diene monomer rubbers (EPDM), commercially available as Exxpro™ from ExxonMobil Chemical. More specifically, these elastomers are brominated polymers derived from a copolymer of isobutylene (IB) and p-methylstyrene (PMS). Bromination selectively occurs on the PMS methyl group to provide reactive benzylic bromine functionality. Another suitable moisture vapor barrier polymer is copolymer of isobulyline and isoprene with a styrene block copolymer branching agent to improve manufacturing processability.

Another suitable moisture vapor barrier polymer is polyisobutylene. Polyisobutylne is a homopolymer, which is produced by cationic polymerization methods. Commercially available grades of polyisobutylene, under the tradename Vistanex™ also from ExxonMobil Chemical, are highly paraffinic hydrocarbon polymers composed on long straight chain molecules containing only chain-end olefinic bonds. An advantage of such elastomer is the combination of low permeability and chemical inertness to resist moisture vapor encroachment, and chemical or oxidative attacks. Polyisobutylene is available as a viscous liquid or semi-solids, and can be dissolved in certain hydrocarbon solvents.

In accordance to another aspect of the invention, halogenated butyl rubber can be blended with a second rubber, preferably a double bond-vulcanizable rubber, in a specific mixing ratio in a two-step kneading process and then cured to form a rubber blend that has low air/vapor permeability and high adhesion to diene rubbers. A clear advantage of this rubber blend is that it provides enhanced adherence to a polybutadiene core or subassembly to provide an enhanced moisture/water vapor barrier layer. This rubber blend is discussed in U.S. Pat. No. 6,342,567 B2. The '567 patent is hereby incorporated herein by reference. Alternatively, a brominated isobutylene/p-methylstyrene, discussed above, can be used in place of the halogenated rubber. Other moisture vapor barrier polymers include thermoplastic elastomer blends that may be dynamically vulcanized and comprise a butyl rubber or a halogenated butyl rubber, such as those discussed in U.S. Pat. Nos. 6,062,283, 6,334,919 B1 and 6,346,571 B1. These references are incorporated herein by reference. Alternatively, butyl rubber may be blended with a vinylidene chloride polymer, i.e., saran, as disclosed in U.S. Pat. No. 4,239,799. The '799 patent is also incorporated herein by reference.

Butyl rubbers can be cured by a number of curing agents. Preferred curing agents for golf ball usage include sulphur for butyl rubber, and a peroxide curing agent, preferably zinc oxide, for halogenated butyl rubbers. Other suitable curing agents may include antimony oxide, lead oxide or lead peroxide. Lead based curing agents may be used when appropriate safety precautions are implemented. Butyl rubbers are commercially available in various grades from viscous liquid to solids with varying the degree of unsaturation and molecular weights. Latex grades are also available.

Butyl rubber and halogenated rubber can be processed by milling, calendering, extruding, injection molding and compression molding, among other techniques. These processing techniques can produce a semi-cured sheets or half-shelves of the moisture vapor barrier material, which can be wrapped around a core or a core subassembly. The moisture vapor barrier can be fully cured by exposure to heat at elevated temperatures typically in the range of about 250° F. to 2000° F.

Additionally, any number of fillers, additives, fibers and flakes, such as mica, micaceous iron oxide, metal, ceramic, graphite, aluminum or more preferably leafing aluminum, can be incorporated into the moisture vapor barrier layer to create a physical barrier, i.e., a more tortuous path, against moisture vapor encroachment.

In accordance to another aspect of the invention, the curing of the moisture vapor barrier material on to the core or the core subassembly is preferably accomplished by infrared radiation (IR). IR advantageously heats the moisture vapor material, e.g., butyl rubber, locally without penetrating the underlying golf ball core and/or other encased layers. Hence, the predetermined properties of the core and/or of the encased layers would not be affected by the heating/curing of the moisture vapor barrier layer. U.S. Pat. No. 6,174,388 B1 discloses that IR can be used effectively to heat and cure the surface of a polymeric object while leaving the other portions of the object unchanged. U.S. Pat. Nos. 5,677,362 and 5,672,393 disclose that IR heating can be used in conjunction with ultraviolet heating to cure polymers effectively. The disclosures of the patents are incorporated by reference in their entirety.

Another advantage of using IR as the curing technique is that suitable moisture vapor barrier polymers, which have cured or cross-linking temperatures that are higher than the softening temperature or the melting temperature of the materials encased therein, can be now employed as the moisture vapor barrier layer and/or other outer layers.

In accordance to another aspect of the present invention, another suitable IR-cured water vapor barrier material is polysulfide rubber including those disclosed in U.S. Pat. Nos. 4,263,078 and 4,165,425, among others. These references are incorporated herein by reference. In one example, the polysulfide rubber is cured with lower alkyl tin oxide, such as di-n-butyl tin oxide, and used in hot applied processes as disclosed in the '425 patent. This particular polysulfide rubber is thiol terminated and cured with the lower alkyl tin oxide at temperatures between 100° C. and 300° C. to become a solid thermoplastic elastomer that can be softened by heating and then cast or injection molded into a water vapor barrier layer. This polysulfide compound is preferably cured by IR.

Another suitable IR-curable polysulfide rubber is based on thiol terminated liquid polysulfide polymer cured with zinc oxide and a sulfur containing compound selected from 2-mercaptobenzothiazol, zinc lower alkyl dithiocarbamate and alkyl thiuram polysulfides at temperatures from about 200° F. to about 390° F. Agents, which improve the flowing properties of the composition, such as copolymers of styrene and alkylenes, organic or inorganic reinforcing fibrous materials, phenolic resins, coumarone-indene resins, antioxidants, heat stabilizers, polyalkylene polymers, factice, terpene resins, terpene resins esters, benzothiazyl disulfide or diphenyl guanidine, can also be added to the composition. Advantageously, this polysulfide rubber possesses a good ability to wet the substrate and forms good bonds with such substrate when cooled and, therefore, is a preferred sealant for the golf ball core. This polysulfide compound is also preferably cured by IR.

Moisture vapor barrier layer comprising polysulfide rubber is fully disclosed in co-pending patent application entitled "Golf Ball With Vapor Barrier Layer and Method for Making Same" filed on the same day as the present application and assigned to the same assignee. The disclosure of this co-pending patent application is incorporated herein by reference.

In accordance to another aspect of the present invention, suitable IR-cured water vapor barrier polymers include single-pack castable polymers. A preferred single-pack polymer uses uretdiones or blocked isocyanates to form a single-pack urethane component. The single-pack blocked isocyanate system, which preferably comprises isocyanate combined with an amine or poloyl, is advantageously stable at room temperature. The application of heat, such as infrared radiation, causes the isocyanate to become unblocked or to react to form a urethane. No mixing or dynamically controlling the ratios of the components is required.

Uretdione castable materials can be pre-formulated as a single-pack system without premature reaction. The mixed single-pack material can be directly injected or poured into a mold, avoiding metering and mixing of multiple components. Parts can be made utilizing viscous or solid materials that previously could not be used with traditional two-pack systems. Advantageously, uretdiones and blocked isocyanates when combined with suitable reactive components can be milled into rubber stock for use with other manufacturing techniques, discussed above.

A non-limiting example of a single-pack system in accordance to the present invention is as follows. Finely ground uretdione is dispersed in a liquid polyol or polyamine in combination with a tin catalyst and cyclic amidine catalyst to form a slurry mixture. The slurry mixture is poured into a suitable golf ball mold to make the required part, e.g., core, intermediate layer or cover. The mold is then heated to reach the predetermined deblocking temperature of about 150–180° C., and the reaction is allowed sufficient time to complete. The cured component then can be removed from the mold for further processing, if necessary.

In another example, 3,5-dimethylpyrazole (DMP) blocked IPDI is used in place of the uretdione in the above example. The mold is then heated to the deblocking temperature of about 140–160° C., and the reaction is allowed sufficient time to complete. In another non-limiting example, the single-pack moisture vapor barrier layer utilizes blocked isocyanates that volatilize when de-blocking occurs, such as diethylmaleonate (DEM) or methyl ethyl ketoxime (MEKO) blocked hexamethylene diisocyanate cyclic trimer. Such an example could be sprayed or dipped onto the golf ball core, subassembly or the like and then followed with an IR cure.

Non-limiting chemical structures of the single-pack system are shown below:
Formation of uretdiones:

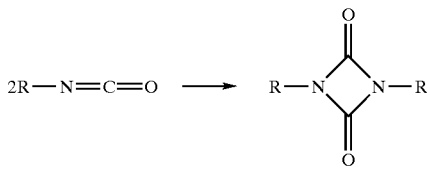

Preferred chemical structure of polyuretdione cross-linker:

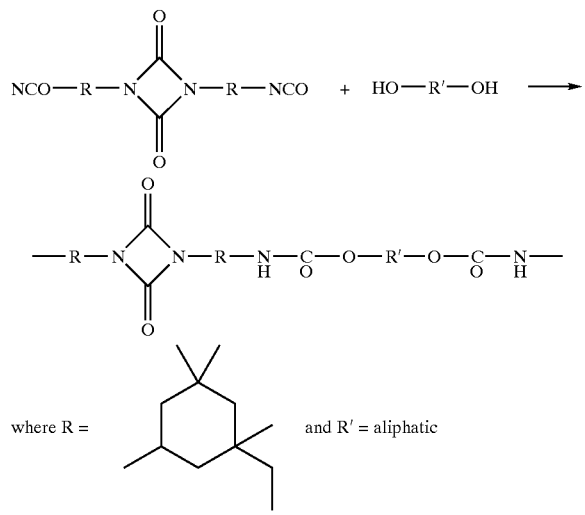

The preferred hardeners are uretdiones or blocked isocyanates, where the blocking agent remains in the component as a solid once cast, such as DMP or triazole blocked isocyanates.
The structures of the preferred blocking agents are:

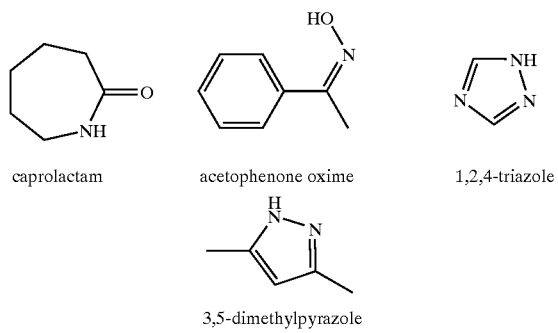

Single-pack castable water vapor barrier material is fully disclosed in parent application Ser. No. 09/973,342, which has been incorporated by referenced.

In accordance to one aspect of the invention, the Shore D hardness values for the core and moisture vapor barrier sub-assemblies have been measured less than about 60 and more specifically in the range of about 5–50. Alternatively, according to other aspects of the invention, the moisture barrier sub-assemblies may have Shore D hardness value of greater than 50, when more rigid materials, such as stiff ionomer with a Shore D hardness of greater than 55 are used in conjunction with the moisture vapor barrier layer 14.

Preferably, a golf ball in accordance to the present invention comprises a solid or multiple-layer solid polybutadiene core 12 having an outer diameter of greater than about 1.50 inches, more preferably 1.550 inches and most preferably about 1.580 inches. Moisture vapor barrier layer 14 has a thickness preferably in the range of about 0.001 inch to about 0.100 inch, more preferably in range of about 0.010 inch to about 0.050 inch and cover 16 is a urethane cover with sufficient thickness to produce a 1.680 inch diameter golf ball.

More preferably, the moisture vapor barrier layer is a thin layer of suitable butyl rubber polymers discussed above, preferably less than 0.050 inch, more preferable less than 0.030 inch and most preferably less than 0.010 inch. It is also preferable that the butyl rubber moisture vapor barrier layer would not significantly and negatively affect the coefficient of restitution of the golf ball. Preferably, the polybutadiene core 12 and the thin butyl rubber moisture vapor barrier layer 14 are covered by a relatively soft polymer cover having a thickness from about 0.010 to about 0.050 inch, more preferably about 0.030 inch and has a Shore D of less than 65 or from about 30 to about 60, more preferably from about 35 to about 50 and even more preferably about 40 to about 45. Such a cover is fully disclosed in U.S. Pat. Nos. 5,885,172 and 6,132,324. The disclosures of these two patents are incorporated herein by reference in their entireties. Preferred cover polymers include thermoset urethanes and polyurethanes, thermoset urethane ionomers and thermoset urethane epoxies.

Figure 3:
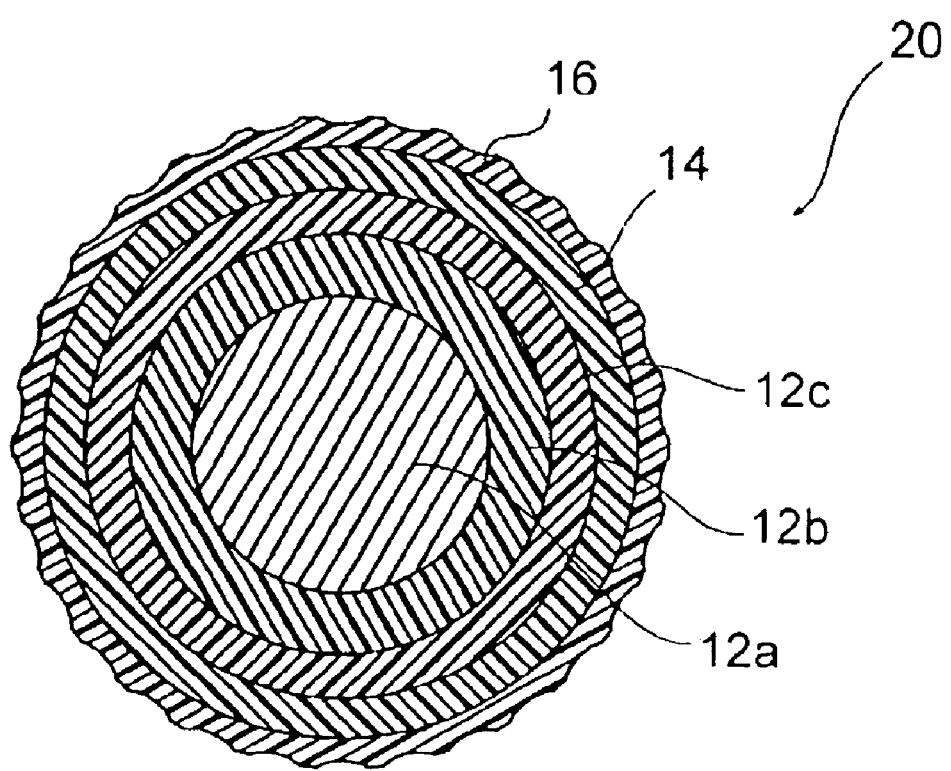
FIG. 3 is a cross-sectional view of another golf ball in accordance to the present invention showing a solid core with multiple wound layers surrounded by a thin moisture vapor barrier layer.

In accordance to yet another aspect of the invention, as shown in FIG. 3 golf ball 20 may have multiple layer core 12a, 12b and 12c, surrounded by intermediate layer 14 and dimpled cover 16. Core layers 12b and 12c may be an integral solid layer or discrete layers molded on each other. Alternatively, both outer core layers 12b and 12c could be wound layers, or one of these two layers may be a wound layer, and the innermost core 12a may be liquid-filled.

While various descriptions of the present invention are described above, it is understood that the various features of the present invention can be used singly or in combination thereof. Therefore, this invention is not to be limited to the specifically preferred embodiments depicted therein.

What is claimed is:

1. A golf ball comprising a cover layer encasing a subassembly, the subassembly comprising a moisture vapor barrier layer encasing a core, wherein the moisture vapor barrier layer has a moisture vapor transmission rate of less than about 0.6 grams·mm/m²·day, and is formed from a composition comprising an elastomer and a double-bond vulcanizable rubber, and a thickness of less than 0.01 inch, wherein the composition is cured by infra red radiation or a combination of infra red and ultra violet radiations, wherein the elastomer comprises branched styrenic blocks.

2. The golf ball of claim 1, wherein the elastomer is halogenated, sulfonated, or both.

3. The golf ball of claim 2, wherein the elastomer is halogenated, and comprises at least one of the following:
   less than about 3% reactive halogen;
   less than about 1 halogen atom per double bond; or
   a benzylic bromine functionality.

4. The golf ball of claim 1, wherein the elastomer comprises a conjugated multi-olefin or an iso-olefin.

5. The golf ball of claim 1, wherein the elastomer is a copolyomer of p-methylstyrene and isobutylene or a brominated copolymer of p-methylstyrene and isobutylene.

6. The golf ball of claim 1, wherein the composition further comprises a filler.

7. The golf ball of claim 6, wherein the filler is selected from a group consisting of leafing aluminum, mica flakes, micaceous iron oxide flakes, aluminum flakes, ceramic flakes, graphite flakes, and mixtures thereof.

8. The golf ball of claim 1, wherein the composition further comprises at least one polymer selected from a group consisting of vinylidene chloride polymers and ionomers.

9. The golf ball of claim 1, wherein the composition has a moisture vapor transmission rate of about 0.001 grams·mm/m$^2$·day to about 0.1 grams·mm/m$^2$·day.

10. The golf ball of claim 1, wherein the composition is a dynamically vulcanizable thermoplastic elastomer blend adhesive to diene rubbers.

11. The golf ball of claim 1, wherein the elastomer has a molecular weight of about 20,000 to about 500,000.

12. The golf ball of claim 1, wherein the composition forms a tortuous path against moisture vapor encroachment.

13. The golf ball of claim 1, wherein the composition is applied in a form selected from a group consisting of liquid, latex, viscous liquid, semi-solid, solid, and in solvents.

* * * * *